United States Patent
Daly et al.

(10) Patent No.: US 7,181,050 B1
(45) Date of Patent: *Feb. 20, 2007

(54) METHOD FOR ADAPTING QUANTIZATION IN VIDEO CODING USING FACE DETECTION AND VISUAL ECCENTRICITY WEIGHTING

(75) Inventors: Scott J. Daly, Kalama, WA (US); Kristine E. Matthews, Vancouver, WA (US); Jordi Ribas-Corbera, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1151 days.

This patent is subject to a terminal disclaimer.

(21) Appl. No.: 09/661,633

(22) Filed: Sep. 13, 2000

Related U.S. Application Data

(63) Continuation of application No. 09/052,591, filed on Mar. 31, 1998, now Pat. No. 6,173,069.

(60) Provisional application No. 60/071,099, filed on Jan. 9, 1998.

(51) Int. Cl.
 *G06K 9/00* (2006.01)
(52) U.S. Cl. ..................................... 382/118
(58) Field of Classification Search ................ 382/118, 382/232–258
 See application file for complete search history.

(56) References Cited

U.S. PATENT DOCUMENTS

| | | | |
|---|---|---|---|
| 4,325,085 A | 4/1982 | Gooch | |
| 4,513,317 A | 4/1985 | Ruoff, Jr. | |
| 4,927,260 A | 5/1990 | Gordon | |
| 4,951,140 A | 8/1990 | Ueno et al. | |
| 5,012,522 A | 4/1991 | Lambert | |
| 5,038,209 A | 8/1991 | Hang | |
| 5,058,187 A | 10/1991 | Kim | |
| 5,058,197 A | 10/1991 | Honkomp et al. | |
| 5,086,480 A * | 2/1992 | Sexton | 382/171 |
| 5,129,049 A | 7/1992 | Cuzzo et al. | |
| 5,159,447 A | 10/1992 | Haskell et al. | |
| 5,187,574 A | 2/1993 | Kosemura et al. | |
| 5,241,383 A | 8/1993 | Chen et al. | |
| 5,274,443 A | 12/1993 | Dachiku et al. | |
| 5,283,646 A | 2/1994 | Bruder | |
| 5,323,187 A | 6/1994 | Park | |
| 5,373,343 A | 12/1994 | Nonaka | |

(Continued)

OTHER PUBLICATIONS

Robert A. McLaughlin, Randomized Hough Transform: Better Ellipse Detection, IEEE TENCON—Digital Signal Processing Applications, 1996, pp. 409-414.*

(Continued)

*Primary Examiner*—Matthew C. Bella
*Assistant Examiner*—Tom Y. Lu
(74) *Attorney, Agent, or Firm*—Chernoff, Vilhauer, McClung & Stenzel

(57) ABSTRACT

A system encodes video by detecting the location of a facial region of a frame of the video. Sensitivity information is calculated for each of a plurality of locations within the video based upon the location of the facial region. The frame is encoded in manner that provides a substantially uniform apparent quality of the plurality of locations to the viewer when the viewer is observing the facial region of the video.

39 Claims, 8 Drawing Sheets

U.S. PATENT DOCUMENTS

| | | | |
|---|---|---|---|
| 5,426,463 A | | 6/1995 | Reininger et al. |
| 5,475,433 A | | 12/1995 | Jeong |
| 5,508,745 A | | 4/1996 | Jo |
| 5,512,939 A | | 4/1996 | Zhou |
| 5,526,052 A | | 6/1996 | Ar |
| 5,550,580 A | | 8/1996 | Zhou |
| 5,550,581 A | | 8/1996 | Zhou |
| 5,557,276 A | | 9/1996 | Sakazawa et al. |
| 5,596,362 A | | 1/1997 | Zhou |
| 5,632,742 A | | 5/1997 | Frey et al. |
| 5,635,947 A | | 6/1997 | Iwamoto |
| 5,764,803 A | * | 6/1998 | Jacquin et al. ............. 382/236 |
| 5,768,466 A | | 6/1998 | Kawamura et al. |
| 5,799,113 A | | 8/1998 | Lee |
| 5,802,242 A | | 9/1998 | Kawamura et al. |
| 5,822,458 A | | 10/1998 | Silverstein et al. |
| 5,852,669 A | * | 12/1998 | Eleftheriadis et al. ...... 382/118 |
| 5,990,957 A | * | 11/1999 | Ryoo .................... 375/240.03 |
| 6,047,101 A | | 4/2000 | Kawamura et al. |
| 6,078,722 A | | 6/2000 | Kawamura et al. |

OTHER PUBLICATIONS

J. Foster, Understanding MPEG-2, Audio Magazine, pp. 36-45, Sep. 1997.

R.A. McLaughlin, Randomized Hough Transform: Better Ellipse Detection, IEEE.

Tencon—Digital Signal Processing Applications, pp. 409-414, Aug. 1996.

J.T. Kim, et al., Subband Coding Using Human Visual Characteristics for Image Signals, IEEE Journal on Selected Areas in Communications, vol. 11, No. 1, pp. 59-64, Jan. 1993.

W. Rabiner, Object Tracking Using Motion-Adaptive Modeling of Scene content, IEEE Publication, pp. 877-881, May 1996.

Rate Control of MPEG Video Coding and Recording by Rate-Quantization Modeling, IEEE Transactions on Circuits and Systems for Video Technology; vol. 6, No. 1, Feb. 1996; 9 pages.

Bit Allocation for Dependent Quantization with Applications to Multiresolution and MPEG Video Coders, IEEE Transactions on Image Processing; vol. 3, No. 5, Sep. 1994; 14 pages.

Rat Control Using Spline-Interpolated R-D Characteristics; Signal and Image Processing Institute and Department of Electrical Engineering-Systems University of Southern California; approx. 1996; 12 pages.

Forward Rate Control for MPEG Recording; Department of Electrical Engineering; Delft; 11 pages.

Human Face Detection in Visual Scenes; School of Computer Science; Pittsburgh, Pennsylvania, Nov. 1995; 26 pages.

Motion-Compensated Video Coding with Adaptive Perceptual Quantization; IEEE Transactions on Circuits and Systems for Video Technology, vol. 1, No. 4, Dec. 1991; 12 pages.

An Automatic System for Model-Based coding of Faces; M.I.T. Media Laboratory Perceptual Computing Section Technical Report No. 317, Cambridge, Massachusetts; Mar. 1995; 5 pages.

Processing Image Sequences Based on Eye Movements; Communications Research Centre, Ontario, Canada; 9 pages.

Automatic face location detection and tracking for model-assisted coding of video teleconferencing sequences at low bit-rates; Siganl Processing: Image Communication 7 (Dec. 1993); 18 pages.

Real-Time Display Systems, Present and Future; Communications Technology Center, Boca Raton, Florida; 1994; 15 pages.

Eye-Slaved Area-of-Interest Display Systems: Demonstrated Feasible in the Laboratory; Advanced Simulation Concepts Division, Naval Training systems Center; 1988; 11 pages.

Video CODEC Test Model, TMN5; Telenor Research; Jan. 31, 1995; 13 pages.

Composite Source Modeling for Image Compression; Lausanne, EPFL, Switzerland; 1995; 14 pages.

\* cited by examiner

METHOD FOR ADAPTING QUANTIZATION IN VIDEO CODING USING FACE DETECTION AND VISUAL ECCENTRICITY WEIGHTING

CROSS REFERENCE To RELATED APPLICATIONS

This application is a continuation of U.S. patent application Ser. No. 09/052,591, filed Mar. 31, 1998, now U.S. Pat. No. 6,173,069, which claims the benefit of U.S. Provisional App. No. 60/071,099, filed Jan. 9, 1998.

BACKGROUND OF THE INVENTION

The present invention relates to a system for encoding facial regions of a video that incorporates a model of the human visual system to encode frames in a manner to provide a substantially uniform apparent quality.

In many systems the number of bits available for encoding a video, consisting of a plurality of frames, is fixed by the bandwidth available in the system. Typically encoding systems use an ad hoc control technique to select quantization parameters that will produce a target number of bits for the video while simultaneously attempting to encode the video frames with the highest possible quality. For example, in digital video recording, a group of frames must occupy the same number of bits for an efficient fast-forward/fast-rewind capability. In video telephones, the channel rate, communication delay, and the size of the encoder-buffer determines the number of available bits for a frame.

There are numerous systems that address the problem of how to encode video to achieve high quality while controlling the number of bits used. The systems are usually known as rate, quantizer, or buffer control techniques and can be generally classified into three major classes.

The first class are systems that encode each block of the image several times with a set of different quantization factors, measure the number of bits produced for each quantization factor, and then attempt to select a quantization factor for each block so that the total number of bits for all the blocks total a target number While generally accurate, such a technique is not suitable for real-time encoding systems because of its high computational complexity.

The second class are systems that measure the number of bits used in previously encoded image blocks, buffer fullness, block activity, and use all these measures to select a quantization factor for each block of the image. Such techniques are popular for real-time encoding systems because of their low computational complexity. Unfortunately, such techniques are quite inaccurate and must be combined with additional techniques to avoid bit or buffer overflows and underflows.

The third class are systems that use a model to predict the number of bits necessary for encoding each of the image blocks in terms of the block's quantization factor and other simple parameters, such as block variances. These models are generally based on mathematical approximations or predefined tables. Such systems are computationally simple and are suitable for real-time systems, but unfortunately they are highly sensitive to inaccuracies in the model itself.

Some rate control systems incorporate face detection. One of such systems, along with other systems that use face detection, is described below.

Zhou, U.S. Pat. No. 5,550,581, discloses a low bit rate audio and video communication system that dynamically allocates bits among the audio and video information based upon the perceptual significance of the audio and video information. For a video teleconferencing system Zhou suggests that the perceptual quality can be improved by allocating more of the video bits to encode the facial region of the person than the remainder of the scene. In addition, Zhou suggests that the mouth area, including the lips, jaw, and cheeks, should be allocated more video bits than the remainder of the face because of the motion of these portions. In order to encode the face and mouth areas more accurately Zhou uses a subroutine that incorporates manual initialization of the position of each speaker within a video screen. Unfortunately, the manual identification of the facial region is unacceptable for automated systems.

Kosemura et al., U.S. Pat. No. 5,187,574, disclose a system for automatically adjusting the field of view of a television door phone in order to keep the head of a person centered in the image frame. The detection system relies on detecting the top of the person's head by comparing corresponding pixels in successive images. The number of pixels are counted along a horizontal line to determine the location of the head. However, such a head detection technique is not robust.

Sexton, U.S. Pat. No. 5,086,480, discloses a video image processing system in which an encoder identifies the head of a person from a head-against-a-background scene. The system uses training sequences and fits a minimum rectangle to the candidate pixels. The underlying identification technique uses vector quantization. Unfortunately, the training sequences require the use of an anticipated image which will be matched to the actual image. Unfortunately, if the actual image in the scene does not sufficiently match any of the training sequences then the head will not be detected.

Lambert, U.S. Pat. No. 5,012,522, discloses a system for locating and identifying human faces in video scenes. A face finder module searches for facial characteristics, referred to as signatures, using a template. In particular, the signatures searched for are the eye and nose/mouth. Unfortunately, such a template based technique is not robust to occlusions, profile changes, and variations in the facial characteristics.

Ueno et al., U.S. Pat. No. 4,951,140, discloses a facial region detecting circuit that detects a face based on the difference between two frames of a video using a histogram based technique. The system allocates more bits to the facial region than the remaining region. However, such a histogram based technique may not necessarily detect the face in the presence of significant motion.

Moghaddam et al., in a paper entitled "An Automatic System for Model-Based Coding of Faces," IEEE Data Compression Conference, March 1995, discloses a system for two-dimensional image encoding of human faces. The system uses eigen-templates for template matching which is computationally intensive.

Eleftheriadis et al., in a paper entitled "Automatic Face Location Detection and Tracking for Model-Assisted Coding of Video Teleconferencing Sequences at Low Bit-Rates," Signal Processing: Image Communication 7 (1995), disclose a model-assisted coding technique which exploits the face location information of video sequences to selectively encode regions of the video to produce coded sequences in which the facial regions are clearer and sharper. In particular, the system initially differences two frames of a video to detect motion. Then the system attempts to locate the top of the head of a person by searching for a sequential series of non-zero horizontal pixels in the difference image, as shown in FIG. 11 of Eleftheriadis et al. A set of ellipses with-various sizes and aspect ratios having their uppermost portion fixed at the potential location of the top of the head are fitted to the image data. Unfortunately, scanning the difference image for potential sequences of non-zero pixels is complex and time consuming. In addition, the system taught by Eleftheriadis et al. includes many design parameters that need to be selected for each particular system and video sequences making it difficult to adapt the system for different types of video sequences and systems.

Glenn, in a chapter entitled "Real-Time Display Systems, Present and Future," from the book Visual Science Engineering, edited by O.H. Kelly, 1994, teaches a display system that varies the resolution of the image from the center to the edge, in the hope that the decrease in resolution would lead to a bandwidth reduction. The resolution decrease is accomplished by discarding pixel information to blur the image. The presumption in Glenn is that the observer is looking at the center of the display. The attempt was unsuccessful because although it was found that the observer's eyes tended to stay in the center one-quarter of the total image area, the resolution at the edges of the image could not be sufficiently reduced before the resulting blur was detectable.

Browder et al., in a paper entitled "Eye-Slaved Area-Of-Interest Display Systems: Demonstrated Feasible In The Laboratory," process video sequences using gaze-contingent techniques. The gaze-contingent processing is implemented by adaptively varying image quality within each video field, such that image quality is maximal in the region most likely to be viewed while being reduced in the periphery. This image quality reduction is accomplished by blurring the image or by introducing quantization artifacts. The system includes an eye tracker with a computer graphic flight simulator. Two image sequences are created. One sequence has a narrow field of view (19 or 25 degrees) with high resolution and the other sequence has a wide field of view (76 or 140 degrees) with low resolution. The two image sequences are combined optically with the high resolution sequence enslaved to the visual system's instantaneous center of gaze. To keep the boundary between the two regions from being distracting an arbitrary linear rolling off (blending) from the high resolution inset image to the low resolution image is used. The use of an eye tracker in the system is unsuitable for inexpensive video telephones where such an eye tracker is not provided. In addition, the linear roll-off does not match the eye's sensitivity variation, resulting in either variable image quality, or unnecessary regions of high resolution.

Stelmach et al., in a paper entitled "Processing Image Sequences Based On Eye Movements," disclose a video encoding system that employs the concept of varying the visual sensitivity as a function of expected eye position. The expected eye position is generated by measuring a set of observers' eye movements to specific video sequences. Then the averaged eye movements are calculated for the set of observers. However, such a system requires measurements of the eye position which may not be available for inexpensive teleconferencing systems. In addition, it is difficult, if not impossible, to extend the system to an unknown image sequence thus requiring observer measurements for any image sequence the system is going to encode. Moreover, variation of the resolution is not an efficient technique for bandwidth reduction.

What is desired, therefore, is a video encoding system that automatically locates facial regions within the video and encodes the video in a manner that provides a uniform quality of the video to a viewer.

SUMMARY OF THE PRESENT INVENTION

The present invention overcomes the aforementioned drawbacks of the prior art by providing a system for encoding video that detects the location of a facial region of a frame of the video. Sensitivity information is calculated for each of a plurality of locations within the video based upon the location of the facial region. The frame is encoded in manner that provides a substantially uniform apparent quality of the plurality of locations to the viewer when the viewer is observing the facial region of the video.

In one embodiment, the detection of the facial region includes receiving a first frame and a subsequent frame of the video, each of which including a plurality of pixels. A difference image is calculated representative of the difference between a plurality of the pixels of the first frame and a plurality of the pixels of the subsequent frame. A plurality of candidate facial regions are determined within the difference image, preferably based on a transform of the difference image in a spacial domain to a parameter space. The plurality of candidate facial regions are fitted to the difference image to select one of the candidate facial regions.

In another embodiment, the detection of the facial region includes fitting the candidate facial regions to the difference image to select one of the candidate facial regions based on a combination of at least two of the following three factors including, a fit factor representative of the fit of the candidate facial regions to the difference image, a location factor representative of the location of the candidate facial regions within the video, and a size factor representative of the size of the candidate facial regions.

In yet another embodiment, the sensitivity information is calculated for each of the plurality of locations within the video based upon both the location of the facial region within the video in relation to the plurality of locations and a non-linear model of the sensitivity of a human visual system.

In a further embodiment, a target bit value equal to a total number of bits available for encoding the frame is identified. The sensitivity information is calculated for each one of the blocks based upon the sensitivity of a human visual system observing a particular region of the image. Quantization values for each of the multiple blocks are calculated to provide substantially uniform apparent quality of each of the blocks in the frame subject to a constraint that the total number of bits available for encoding the frame is equal to the target bit value. The blocks are encoded with the quantization values.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

In very low bit rate video teleconferencing systems, state-of-the-art coding techniques produce artifacts which are systematically present throughout coded images. The number of artifacts increases with both increased motion between frames and increased image texture. In addition, the artifacts usually affect all areas of the image without discrimination. However, viewers will mostly notice those coding artifacts in areas of particular interest to them. In particular, a viewer of a video teleconferencing system or video telephone will typically focus his or her attention to the face(s) of the person(s) on the screen, rather than to areas such as clothing or background. While fast motion may mask many coding artifacts, the human visual system has the ability to lock on and track particular moving objects, such as a person's face. Accordingly, communication between viewers of very low bit-rate video teleconferencing systems or video telephones will be intelligible and pleasing only when the person's face and facial features are not plagued with an excessive amount of coding artifacts.

Figure 1:
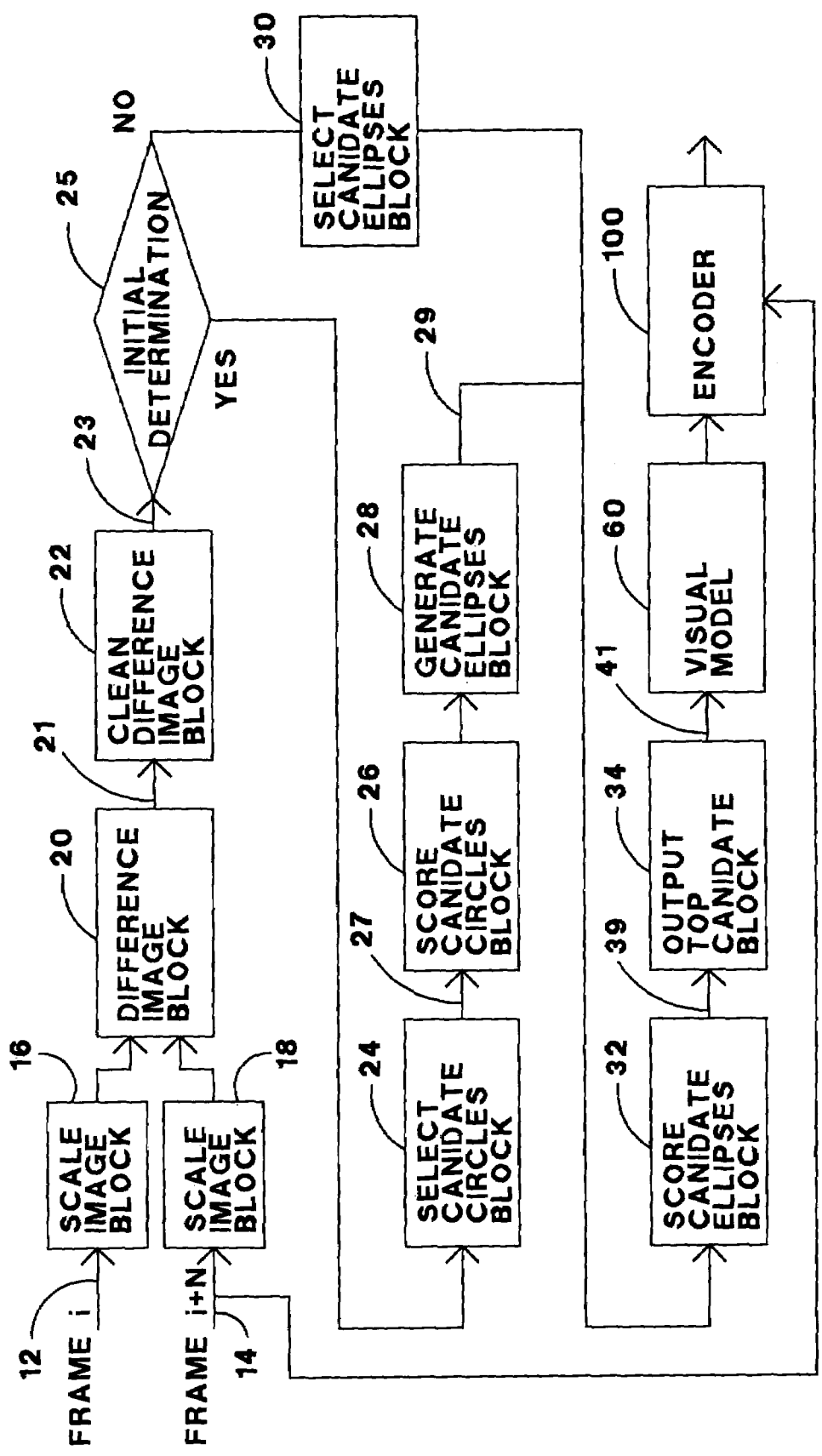
FIG. 1 is a block diagram of an exemplary embodiment of a face detection module of the present invention.

Referring to FIG. 1, a face detection module 10 receives frame i 12 and frame i+n 14, each consisting of a plurality of pixels. Frames i and i+n may be immediately successive frames or frames spaced apart by n frames. Frame i 12 is resized by a scale image block 16 to reduce its number of pixels. The pixel reduction reduces the computational requirements of the system by narrowing the search space. Frame i+n 14 is likewise resized by a scale image block 18 in the same manner as the scale image block 16.

A scale factor used by the scale image blocks 16 and 18 is variable so that the resulting number of pixels may be selected to provide sufficient image detail. When initially detecting a face within a sequence of images the scale factor is preferable twice (or any other suitable value) the scale factor used in subsequent calculations. Thus, when initially detecting a face the resulting image will include substantially more pixels than during subsequent tracking. This insures a good initial determination of the face location and reduces the computational requirements of subsequent tracking calculations since the initial location is used as a starting location to narrow the search space.

In many applications where a person's head is moving on a constant background, such as a video telephone, the movement of the head may be detected by subtracting two frames of the video from one another. The resulting non-zero values from the subtracted frames may be representative of motion, such as the head of a person. A difference image block 20 subtracts the scaled images from the scale image blocks 16 and 18 from one another to obtain a difference image 21. More particularly, the difference image 21 is obtained by: $d_{i+n}(k)=1_{i+n}(k)-1_i(k)$, where k is the spatial location of the pixel in the resized image frame, 1 is the luminance, and the subscripts indicate the temporal location of the image frame.

A clean difference image block 22 attempts to remove undesirable non-zero pixels from the difference image 21 and add desirable non-zero pixels to the difference image 21. Initially, the clean difference image block 22 performs a thresholding operation on the difference image 21:

$$d^{th}_{i+n}(k) = 0; |d_{i+n}(k)| \le T$$
$$1; |d_{i+n}(k)| > T$$

where T is a predefined threshold value and |.| denotes absolute value. The resulting thresholded image is represented by 1's and 0's. Thereafter, morphological operations are performed on the thresholded image which, for example count the number of non-zero pixels in a plurality of regions of the image. If the non-zero pixel count within a region is sufficiently small then all the pixels within that region are set to zero. This removes scattered noise within the thresholded image. Likewise, if the non-zero pixel count within a region is sufficiently large then all the pixels within that region are set to one. This enhances those regions of the image indicative of motion. The overall effect of the morphological operations is that scattered ungrouped non-zero pixels are set to zero and holes (indicated by zeros) in the grouped non-zero regions are set to one. The output from the clean difference image block 22 is a cleaned image 23.

Next, the facial regions are identified within the cleaned image. A face generally has an elliptical shape so the face detection module 10 adopts an ellipse as a model to represent a face within the image. Although the upper (hair) and lower (chin) areas in actual face outlines may have quite different curvatures, ellipses provide a good trade-off between model accuracy and parametric simplicity. Moreover, due to the fact that the elliptical information is not actually used to regenerate the face outline, a small lack of model-fitting accuracy does not have any significant impact on the overall performance of the coding process.

An ellipse of arbitrary size and "tilt" can be represented by the following quadratic, non-parametric equation (implicit form):

$$ax^2+2bxy+cy^2 2dx+2ey+f=0$$

$$b2-ac<0$$

To reduce the computational requirements, the system initially identifies the top portion of a person's head with a model of a circle with an arbitrary radius and center. The top of the head has a predictable circular shape for most people so it provides a consistent indicator for a person. Decision block 25 branches to a select candidate circles block 24 if the initial determination of a face location for a sequence of video is necessary, such as a new video or scene of a video. The select candidate circles block 24 identifies candidate circles 27 as the top m peaks, where m is a preset parameter, in an accumulator array of a Hough transform of the image. A suitable Hough transform for circles is:

$$A(x_c, y_c, r) = A(x_c, y_c, r) + 1 \forall x_c, y_c, r \in (x-x_c)^2 + (y-y_c)^2 = r^2$$

where $A(.,.,.)$ is the accumulator array and $(x,y)$ are pixels in the cleaned difference image 23 which exceed the threshold. The Hough transform maps the image into a parameter space to identify shapes that can be parameterized. By mapping the cleaned difference image to a parameter space, the actual shapes corresponding to the transform can be identified, in contrast to merely looking for a series of pixels in the image space which does not accurately detect suitable curvatures of the face, as taught by Eleftheriadis.

A score candidate circles block 26 scores each of the candidate circles 27, in part, based on the fit of the cleaned difference image 23 to the respective candidate circle 27. The fit criterion used is as follows. If C is a candidate circle 27, then let $M_c$ be a mask such that.

$$M_c(k) = 1; \quad k \text{ inside or on } C$$
$$0; \quad \text{otherwise.}$$

A pixel k is on the circle contour, denoted $C_i$, if the pixel is inside or on the circle, and at least one of the pixels in its $(2L+1)\times(2L+1)$ neighborhood is not. A pixel k is on the circle border, denoted by $C_e$, if the pixel is outside the circle, and at least one of the pixels in its $(2L+1)\times(2L+1)$ neighborhood is either inside or on the circle. The normalized average intensities $I_i$ and $I_e$ are defined:

$$I_i = (1/|C_i|)\Sigma d_{i+n}^{th}(k) \text{ where } k \in c_i$$

and $$I_e = (1/|C_e|)\Sigma d_{i+n}^{th}(k) \text{ where } k \in c_e$$

where |.| denotes cardinality. The measure of fit is then defined as:

$$R = (1+I_i)/(1+I_e)$$

A large value of R indicates a good fit of the data to the candidate circle 27. In contrast, a small value of R indicates a poor fit of the data to the candidate circle 27.

Figure 2:
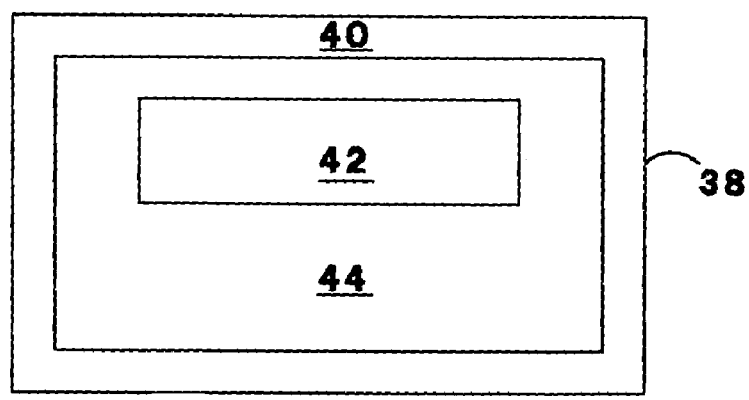
FIG. 2 is an example of location weightings for centers of the face detection module of FIG. 1.
Figure 3:
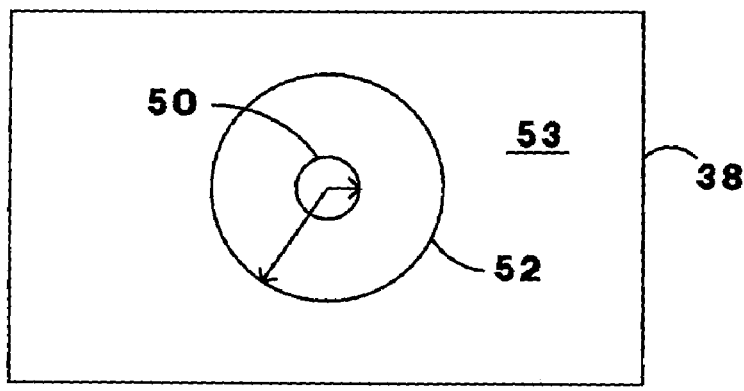
FIG. 3 is an example of radii limits of the face detection module of FIG. 1.

While the respective value of R provides a reasonable estimation of the appropriateness of the respective candidate circle 27, the present inventors came to the realization that video teleconferencing devices have implicit characteristics that may be exploited to further determine the appropriateness of candidate circles. In most video telephone applications the head is usually centrally located in the upper third of the image. Moreover, the size of the face is usually within a range of sizes and thus candidate circles that are exceedingly small or excessively large are not suitable. Accordingly, in addition to the fit data, the score candidate circles block 26 also examines the size and location of the circle. Referring to FIG. 2, the outer border region 40 of a display 38 is an unsuitable location for a center of a candidate circle 27, the central upper third region 42 of the display 38 is a desirable location for the center of a candidate circle 27, and the remaining region 44 of the display 38 is acceptable. For example, the undesirable outer border region 40 may have a weighting factor of 0.25, the acceptable region 44 a weighting factor of 0.5, and the desirable central upper third region 42 a weighting of 1.0. Referring to FIG. 3, the radii of candidate circles 27 likewise have a similar distribution of suitability. A candidate circle 27 with a radius less than- the small radii 50 is undesirable and may be given a weighting of 0.1. A candidate circle 27 with a radius between the small radii 50 and an intermediate radii 52 is desirable and may be given a weighting of 0.6. The remainder of the possible large candidate circle radii 53 are undesirable and may be given a weighting of 0.2. Any other suitable weighting factors may be used for the radii and locations.

The three parameters used to determine the suitability of a candidate circle are the fit of the candidate circle to the cleaned image data, the location of the candidate circle's center, and the size of the candidate circle's radii. Any suitable ratio of the three parameters may be used, such as $(0.5)*\text{fit}+(0.25)*\text{center}+(0.25)*\text{size}$. The candidate circles with the highest score are subsequently used as potential locations of the face in the image for matching with candidate ellipses to more accurately model the face. Using circles for the initial determination provides a fast computationally efficient technique for determining candidate face locations.

Figure 4:
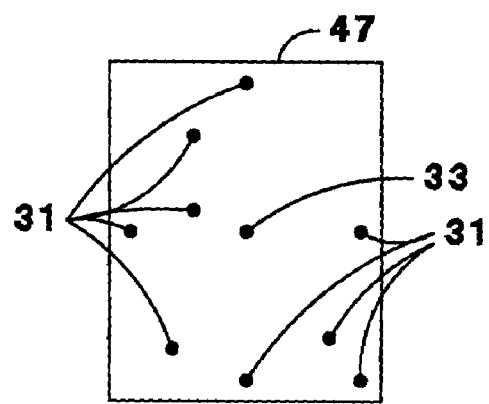
FIG. 4 is an example of centers of considered ellipses of the face detection module of FIG. 1.

After the initial candidate circles are determined and scored, a generate candidate ellipses block 28 generates a set of potential ellipses 29 to be matched to the cleaned image 23 for each candidate circle With a sufficient score. Ellipses with a center in the region around the center of the suitable candidate circle and a set of radii in the general range of that of the respective candidate circle are considered. Referring to FIG. 4, the centers of considered ellipses include a set of ellipse centers 31 in a range in the horizontal direction and the vertical direction about the center 33 of the respective candidate circle. The range of candidate ellipse centers in the vertical direction, "Y," is greater than the range of candidate ellipse centers in the horizontal direction, "X." The reason for the increased variability in the vertical direction is because faces. tend to have an elliptical shape in the vertical direction, so increased variability in the vertical direction of the center of the candidate ellipse permits a better fit to the actual face location. In contrast, faces tend not to vary much in the horizontal direction so less variability is necessary. In other words, based on the location of initial second candidate circles there is more confidence in the centers in the horizontal direction than the vertical direction. This difference in variability helps reduce the number of candidate ellipses considered which reduces the computational requirements of the system.

Preferably, a set of candidate ellipses for each circle center are considered with centers within a region 47 around the circle center 33 and having radii somewhat less than and greater than the radii of the circle.

The candidate ellipses 29 from the generate candidate ellipses block 28 are then scored by the score candidate ellipses block 32 which scores the candidate ellipses 29 using the same fit criteria as the score candidate circles block 26, except that an elliptical mask is used instead of a circular one. The score candidate ellipses block 32 may additionally use the center location of the ellipse and its radii's as additional parameters, if desired.

The candidate ellipse 39 with the highest score is then output 41 by an output top candidate block 34 to the remainder of the system. The parameters provided by the output top candidate block 34 are:

| | |
|---|---|
| center x | horizontal location of ellipse center |
| center y | vertical location of ellipse center |
| radius x | x axis radius of ellipse |
| radius y | y axis radius of ellipse |
| angle θ | tilt. |

The tilt parameter is optional.

An alternative is to use circles throughout the face detection module 10 and remainder of the system as being sufficient matches to a face and output the parameters of the circle. The parameters of a circle are:

| | |
|---|---|
| center x | horizontal location of circle center |
| center y | vertical location of circle center |
| radius | radius of circle. |

It is to be understood that other parameters or the ellipse or circle may likewise be provided, if desired, such as a diameter which is representative of its respective radius.

To track the face between successive frames, another two frames of the video are obtained and cleaned by the face detection module 10. The initial determination block 25 determines that the initial face location has been determined and passes the cleaned image 23 from the clean difference image block 22 to a select candidate ellipses block 30. The select candidate ellipses block 30 determines a set of potential ellipses based on the previous top candidate ellipse 41 from output top candidate block 34. The set of potential ellipses is selected from a substantially equal range of centers in both the horizontal and vertical directions. There is no significant reason to include the variability of the generate candidate ellipses block 28 used for the initial face position because the location of the face is already determined and most likely has not moved much.

Subsequent tracking involves following the motion of the head itself where motion is just as likely in either the vertical and the horizontal directions, as opposed to a determination of where the head is based on an inaccurate circular model. The radii selected for the candidate ellipses (x and y) are likewise in a range similar to the previous top candidate ellipse 41 because it is unlikely that the face has become substantially larger or substantially smaller between frames that are not significantly temporally different. Reducing-the difference in variability between the horizontal and vertical directions reduces the computational requirements that would have been otherwise required.

The candidate ellipses from the select candidate ellipses block 30 are passed to the score candidate ellipses block 32, as previously described. The output top candidate block 34 outputs the candidate ellipse with the highest score. The result is that after the initial determination of the face location the face detection module 10 tracks the location of the face with the video.

The face detection module 10 may be extended to detect multiple faces. In such a case the output top candidate block 34 would output a set of parameters for each face detected.

Alternative face detection techniques may be used to determine the location of the face within an image. In such a case the output of the face detection module is representative of the location of the face and its size within a video.

If desired, a gaze detection module which detects the actual viewer's eye position may be used to determine the location of the region of interest to the viewer, within a video. This may or may not be a face.

Figure 5:
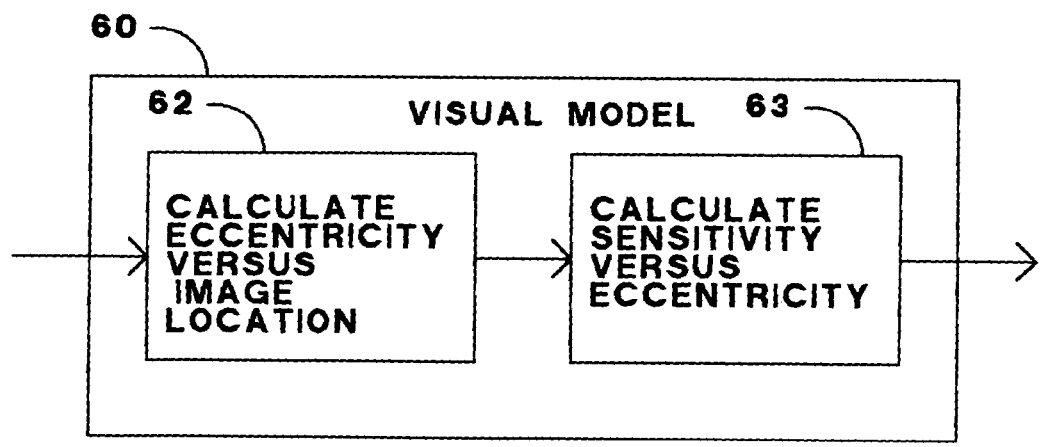
FIG. 5 is a block diagram of an exemplary embodiment of a visual model of the present invention.

The present inventors came to the realization that the human eye has a sensitivity to image detail that is dependent on the distance to the particular pixels of the image and the visual angle to the particular pixels of the image. Referring to FIG. 5, the system includes a non-linear visual model 60 of the human eye to determine appropriate weighting for each of the pixels or regions of the image.

Figure 6:
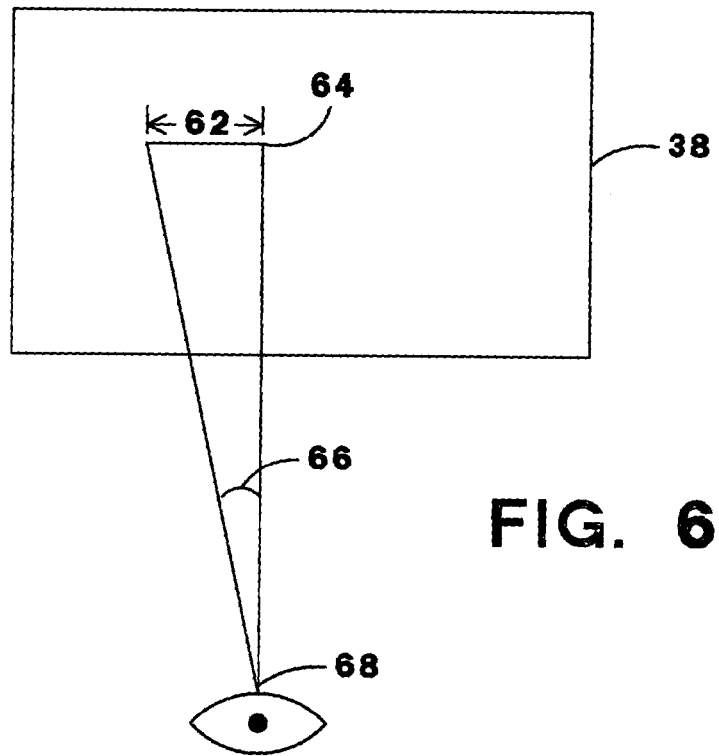
FIG. 6 illustrates the relationship between the a distance on the display of a viewer's focus and the resulting visual angle of the viewer.

The visual model 60 calculates the sensitivity of the human eye versus the location within the image. Referring to FIG. 6, the visual model 60 initially determines the relationship between a distance 62 on the display 38 of the viewers focus 64 and the resulting visual angle 66 of the viewer 68 to the end of the distance 62. The visual angle 66 will depend on the anticipated viewing distance of the viewer. The angular relationship is preferably specified in multiples of image heights or pixel heights, as opposed to absolute distances. The angular relationship is also preferably set for the particular system based upon the expected viewing distance and particular display 38. Alternatively, the angular relationship could be determined by a sensor determining the viewing distance together with information regarding the particular display 38.

Figure 7:
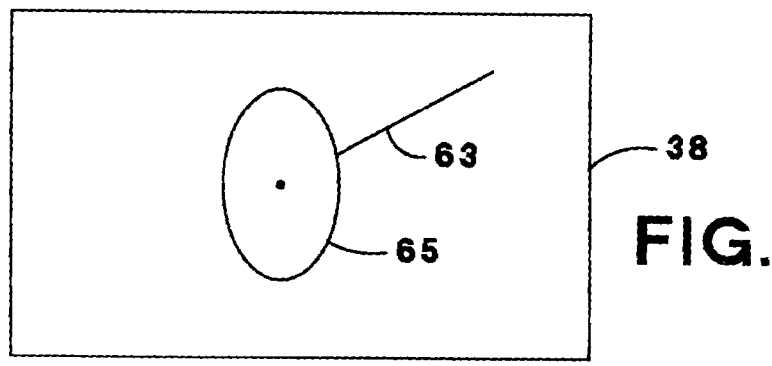
FIG. 7 illustrates an eccentricity in visual angle for each location as a function of the distance from the detected region boundary.

Referring to FIGS. 5 and 7, the visual model 60 calculates at block 62 an eccentricity in visual angle for each pixel, location, or region as a function of the distance 63 from the detected region boundary 65 of the face from the output 41 of the output top candidate block 34. The pixel distance from the region boundary is:

$$\theta_E = \frac{180}{\pi} \tan^{-1}\left(\frac{\sqrt{\left(\frac{y-y_c}{y_R}\right)^2 + \left(\frac{x-x_c}{x_R}\right)^2} - 1}{v}\right)$$

where $O_e$ is the eccentricity in units of visual angle, y is the vertical pixel position in the image frame, and x is the horizontal pixel position. The following four parameters are the outputs from the face detection module 10: $y_c$, $c_x$, $y_r$, and $x_r$, where $x_c$ and $y_c$ are the (x,y) center positions of the selected ellipse in the frame, and $x_r$ and $y_r$ are the elliptical radii in the horizontal and vertical directions, respectively (i.e., the horizontal and vertical minor and major axes are $2x_r$ and $2y_r$, respectively). V is the viewing distance in the units of pixel distances, (e.g., in viewing an image with a height of 512 lines of pixels with a viewing distance. of 2 picture heights, V=2*512=1024).

Figure 8:
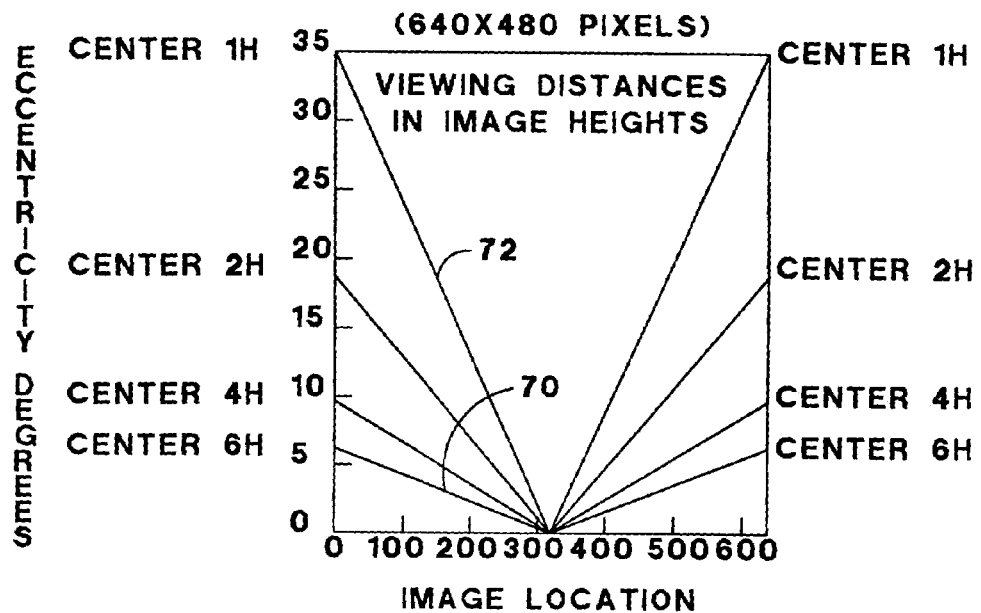
FIG. 8 illustrates an eccentricity versus location for a series of viewing distances.

Referring to FIG. 8, a graph of the eccentricity (in visual angle) for a single pixel location for a series of viewing distances, from 1 image height to 6 image heights, is shown. The viewing location is the center of a 640 by 480 pixel display. For example, a viewer at a distance of 6 image heights 70 observes 6 degrees eccentricity in comparison to a larger 35 degrees of eccentricity at a distance of 1 image height 72 when looking at the edge of the display 38. It is noted that $x_R$ and $y_R$ are both zero in FIG. 8.

Figure 9:
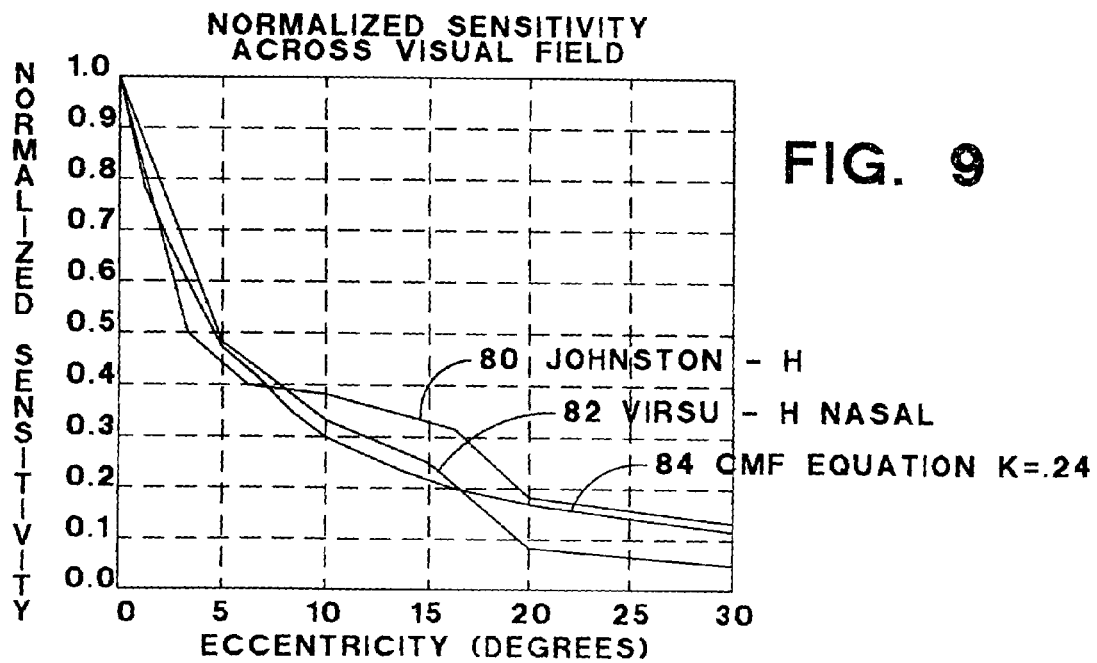
FIG. 9 illustrates a set of visual sensitivity data sets for absolute sensitivity of the human visual system.
Figure 10:
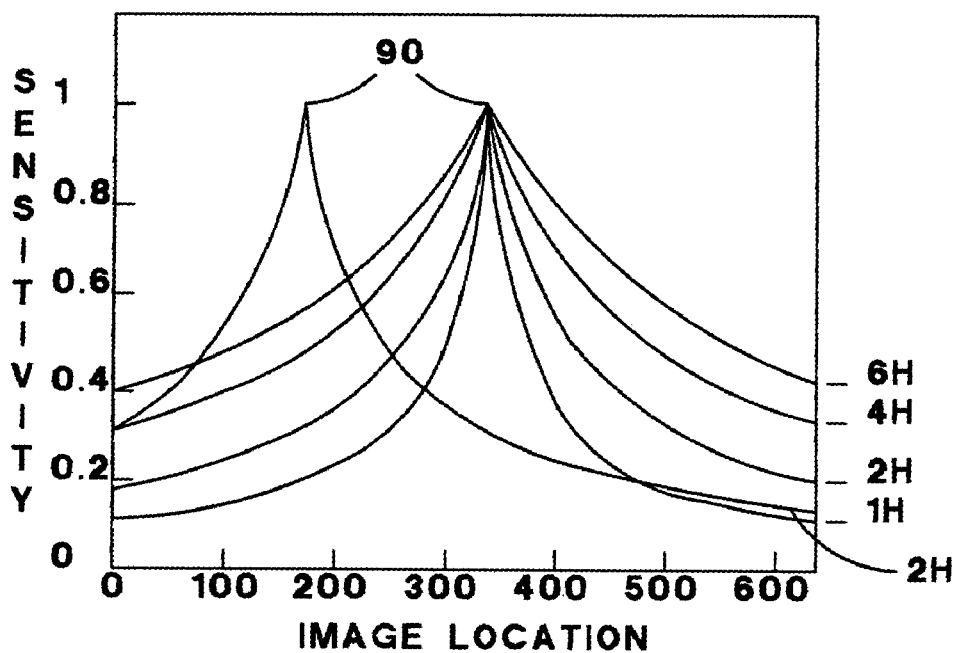
FIG. 10 illustrates the visual sensitivity as a function of pixel location.

The visual angle of the viewer to each pixel of the image is then used as a basis of calculating, at block 63, the viewer's sensitivity to each pixel or block based on a non-linear model of the human visual system. Referring to FIG. 9 and the eccentricity calculation of FIG. 8, a set of measured data sets 80 and 82 (actual data) for absolute sensitivity of the human visual system is obtained across all frequencies. The data sets 80 and 82 are used to determine the maximum sensitivity to the frequency response of the human visual system. A Cortical Magnification Function (CMF) (shown below) fits the data well and provides data set 84, which is a function of how many brain cells are allocated to each visual field location. In essence, FIG. 9 illustrates a non-linear actual model of the sensitivity of the human visual system as a function of eccentricity. The sensitivity can be normalized for use in general rate control or an absolute value where visually lossless quality is needed. Applying the sensitivity data of FIG. 9 to a pixel image results in an image of the same size as the original pixel image (or of a macro block sampled image) and gives the visual sensitivity as a function of pixel location, as shown in FIG. 10. The CMF equation governing data set 84 FIG. 10 is:

$$S = \frac{1}{1 + k_{ECC}\theta_E}$$

where S is the visual sensitivity, $K_{ECC}$ is a constant (preferred value is 0.24), and $\theta_E$ is the eccentricity in visual angle as given in the CMF equation. The CMF equation is referred to as the Cortical Magnification Function. The result is a sensitivity image, or map, that can be determined at any desired resolution with respect to the starting image sequence. The CMF equation may also be applied to the image where the viewer is observing any arbitrary location 90, resulting in different sensitivity values for the pixels. In the preferred embodiment, the location 90 is the top-candidate ellipse 41 for the particular frame.

Figure 11:
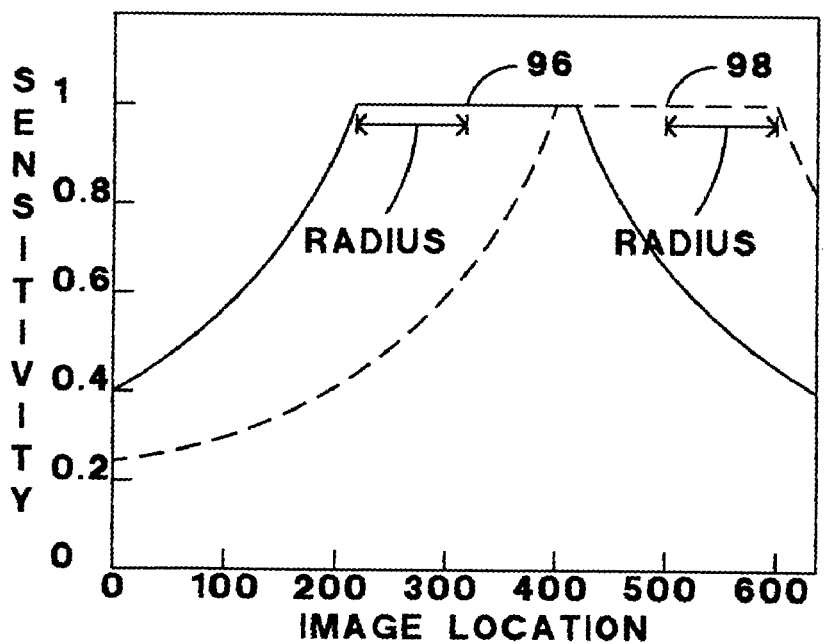
FIG. 11 illustrates the resulting cross section of sensitivity values for an elliptical object.

FIG. 11, illustrates the resulting cross section of the sensitivity values for an elliptical object with a radius of 100, centered at position 96 (solid line) and at position 98 (dashed line). It is also possible to use the visual weighting of the image for multiple elliptical (or other shapes) regions of importance. It is noted that the cross sectional region of the indicated facial region is constant, namely 1.

It is to be understood that other non-linear models based on the actual human visual system may likewise be used to associate sensitivity information with pixels, locations, or regions of an image.

The visual model 60 produces sensitivity information as a function of the location within the image in relation to a model of the human visual system. The values preferably range from 0 to 1, where 1 is the most sensitive. Referring again to FIG. 1, the image has a sensitivity associated with each region, block, or pixel of the image. The video frame 14 needs to be encoded by an encoder 100 and then stored or transmitted with a pre-selected target number of bits, suitable for the particular system. The following description is based on a typical block-based image encoder 100, but it is to be understood that any other encoder may likewise be used, such as a region or pixel based encoder.

Figure 12:
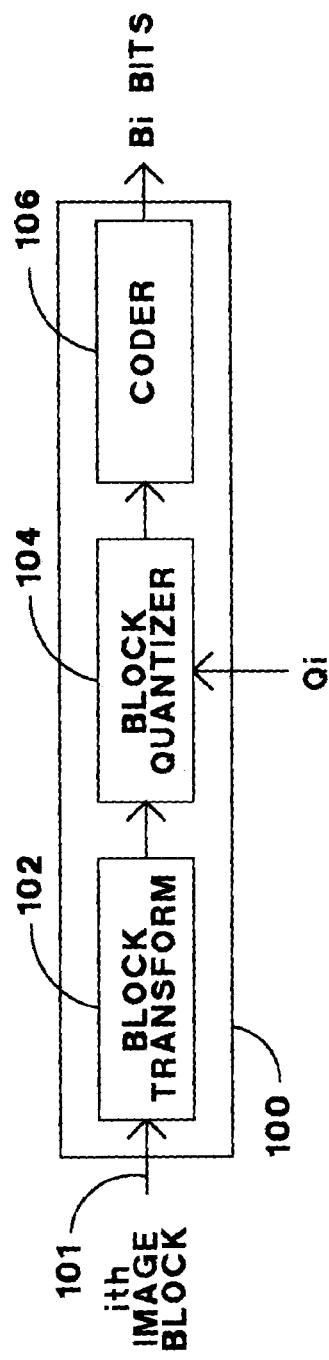
FIG. 12 is an exemplary embodiment of a block diagram of a block-based image encoding system of the present invention.

Referring to FIG. 12, in a block-based image encoding system, such as MPEG-1, MPEG-2, H.261, and H.263, the image (frame) to be encoded is decomposed into a plurality of image blocks 101 of the same size, typically of 16×16 pixels per block. The pixel values of each block are transformed by a block transform 102 into a set of coefficients, preferably by using a Discrete Cosine Transform (DCT). The resulting coefficients are quantized by a block quantizer 104 and then encoded by a coder 106.

The quantization of the transformed coefficients determines the quality of the encoding of each image block 101. The quantization of the ith image block 101 is controlled by only one parameter, $Q_i$, within the block quantizer 104. In the H.261 and the H.263 video encoding standards, $Q_i$ is referred to as the quantization step for the ith block and its value corresponds to half the step size used for quantizing the transformed coefficients. In the MPEG-1 and the MPEG-2 standards, $Q_i$ is referred to as the quantization scale and the jth coefficient of a block is quantized using a quantizer of step size $Q_i w_j$, where $w_j$ is the jth value of a quantization matrix selected by the designer of the MPEG codec. The H.261, H.263, MPEG-1, and MPEG-2 standards are incorporated by reference herein.

The number of bits produced when encoding the ith image block, $B_i$, is a function of the value of the quantization parameter $Q_i$ and the statistics of the block. If $Q_i$ is small, the image block is quantized more accurately and the image block quality is higher, but such a fine quantization produces a large number of bits (large $B_i$) for the image block. Coarser quantization (large $Q_i$) produces a fewer number of bits (small $B_i$) but the image quality is also lower.

In image coding, the image blocks are said to be intracoded, or of class intra. In video encoding, many of the blocks in a frame are similar to corresponding blocks in previous frames. Video systems typically predict the value of the pixels in the current block from previously encoded blocks and only the difference or prediction error is encoded. Such predicted blocks are said to be interceded, or of the class inter. The techniques described herein are suitable for intra, inter, or both intra and inter blocks encoding techniques.

Figure 13:
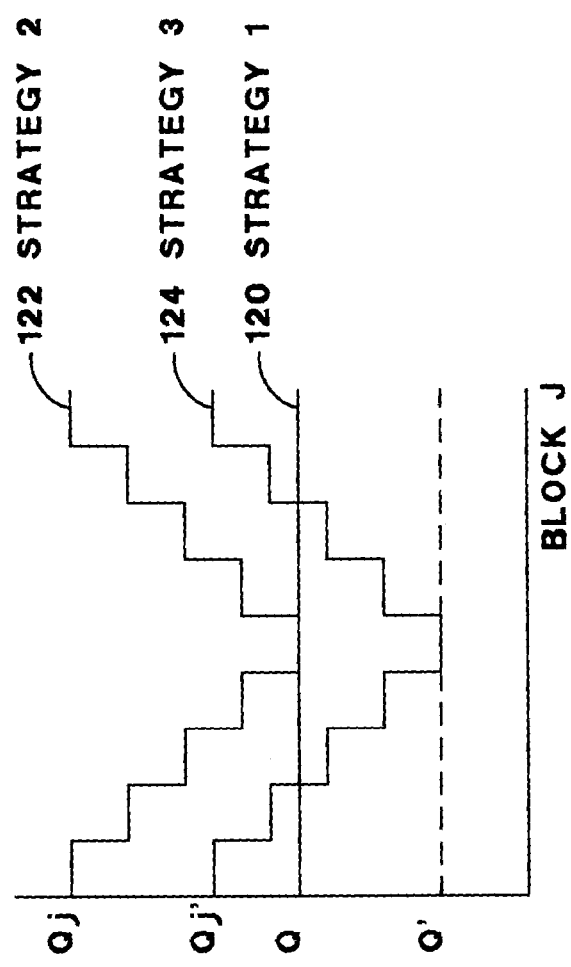
FIG. 13 illustrates a set of quantization steps versus block number for one row of blocks in a frame.

Referring to FIG. 13, a set of quantization steps $Q_j$ versus block number j for one row of blocks in a frame is shown. There are three different video coding strategies discussed below. Each technique is first briefly discussed then the latter two are discussed in greater detail.

First Video Coding Strategy

The first strategy is represented by line 120, which uses the same quantization value Q for all the blocks in the row. This may be referred to as the fixed-Q method. The resulting number of bits to encode the row of blocks is referred to as B.

Second Video Coding Strategy

The second strategy is represented by the staircased line 122. $Q_i$ is set to Q for the block closest to the location where the system has determined that the viewer is observing, such as the face region. In FIG. 13, the viewing location is shown as the middle of the row. $Q_j$'s are selected to be larger than Q for blocks farther from the center. Since all the quantization steps are as large as or larger than those for the fixed-Q strategy 120, the staircased line 122 technique will encode the blocks in the row with fewer bits. The resulting number of bits necessary to encode the row of blocks using the staircased line 122 technique is referred to as B', where B'<B. With the proper selection of $Q_j$ for each block the image quality will appear uniform to the human eye, as described in detail below. Accordingly, the perceived quality of the encoded images using line 120 or line 122 will be the same, but, as mentioned above, using line 122 will produce fewer bits.

Third Video Coding Strategy

If the quantization steps of line 122 are reduced by a constant, the number of bits necessary to encode the blocks will be greater than B'. The staircase line 124 represents the steps $Q_j'$ used for encoding the blocks resulting in the same number bits B as the line 120. The blocks of the entire row will be perceived by the viewer as having the same image quality, with the proper selection of the $Q_j'$ values. The center is quantized with step size of $Q'<Q$, resulting in the image quality at the center having a better quality than the fixed-Q technique. Hence, the perceived image quality to the viewer of the entire row, which is substantially uniform, will be higher than the fixed-Q case, even though both techniques use the same number of bits B.

The objective of the staircased line 124 is to find the proper $Q_j'$ values automatically, so that the pre-selected target number of bits (in this case B) is achieved.

Details of Second Strategy

The present inventor came to the realization that a coarser quantization on image blocks to which the viewer is less sensitive can be performed without affecting the perceived image quality. In fact, when encoding digital video, the quantization factor can be increased according to the sensitivities of the human visual system and thereby decrease the number of bits necessary for each frame. In particular, if the entire N blocks of the image are quantized and encoded with quantization steps:

$$Q/S_1, Q/S_2, \ldots Q/S_N, \quad \text{Equation 1}$$

respectively, where $S_k$ is the sensitivity associated to the kth block, the perceived quality of the encoded frame will be the same as if all the blocks were quantized with step size Q. Since the $S_k$'s are smaller than or equal to 1, the resulting quantizers in Equation 1 will be as large as or larger than Q, and therefore will produce fewer bits when encoding a given frame.

To summarize, the result of such an encoding scheme where the sensitivities are representative of the perceived image quality based on a model of the human visual system and varying the quantization factor with respect to the sensitivity information, provides an image that has a perceived uniform quality. This also provides a minimum bit rate with the uniform quality.

The following steps may be used to reduce the number of bits for a video frame using a preselected base quantization step size Q.

STEP 1. Initially set k equal to 1.

STEP 2. Find the maximum value of the sensitivity for the pixels in the kth block, $S_k$, $$S_k = \max(S_{k,1}, S_{k,2}, S_{k,3}, \ldots S_{k,L}) \quad \text{Equation 2}$$

where $S_{k,i}$ is the sensitivity for the ith pixel in the kth block. Alternatively, the maximum operation could be replaced by any other suitable evaluation of the sensitivities of a block, such as the average of the sensitivities.

STEP 3. Encode the kth block with a quantizer of step size $Q/S_k$,

STEP 4. If k<N, then let k=k+1 and go to step 1. Otherwise stop.

Details of Third Strategy

In many system the total number of bits available for encoding a video frame is often set in advance by the user or the communication channel. Consequently, some rate or quantizer control strategy is necessary for selecting the value of the quantization steps so that the frame target is achieved as suggested by line 124 of FIG. 13. In other words, selecting the number of bits results in the aforementioned base Q likely not matching the available bandwidth.

A model for the number of bits invested in the ith image block is:

$$B_i = A\left(K\frac{\sigma_i^2}{Q_i^2} + C\right), \quad \text{Equation 3}$$

where $Q_i$ is the quantizer step size or quantization scale, A is the number of pixels in a block (e.g., in MPEG and H.263 $A=16^2$ pixels), K and C are model parameters (described below). $\sigma_i$ is the empirical standard deviation of the pixels in the block, and is defined as:

$$\sigma_i = \sqrt{\frac{1}{A}\sum_{j=1}^{A}(P_i(j) - \overline{P}_i)^2}, \quad \text{Equation 4}$$

with $P_i(j)$ the value of the jth pixel in the ith block and $\overline{P}_i$ is the average of the pixel values in the block. $\overline{P}_i$ is defined as, $$\overline{P}_i = \frac{1}{A}\sum_{j=1}^{A} P_i(j). \quad \text{Equation 5}$$

For a color image, the $P_i(j)$'s are the values of the luminance and chrominance components for the block pixels. The model of Equation 3 was derived using a rate-distortion analysis of the block's encoder and is discussed in greater detail in co-pending U.S. patent application Ser. No. 09/008,137, filed Jan. 16, 1998, incorporated by reference herein.

K and C are model parameters. K depends on the encoder efficiency and the distribution of the pixel values, and C is the number of bits for encoding overhead information (e.g., motion vectors, syntax elements, etc.). Preferably, the values of K and C are not known in advance and are estimated during encoding.

The objective of the third technique is to find the value of the quantization steps that satisfy the following two conditions:

(1) the total number of bits produced for the image is a pre-selected target B; and (2) the overall image quality is perceived as homogenous, constant, or uniform.

Let N be the number of blocks in the video frame. The first condition in terms of the encoder model is:

$$B = \sum_{i=1}^{N} B_i = \sum_{i=1}^{N} A\left(K\frac{\sigma_i^2}{Q_i^2} + C\right). \quad \text{Equation 6}$$

As described in relation to the second strategy, the second condition is satisfied by a set of quantizers, $$\frac{Q'}{S_1}, \frac{Q'}{S_2}, \ldots, \frac{Q'}{S_N}, \qquad \text{Equation 7}$$

where $(Q'/S_k) = Q_k$ is the quantization step of the kth block, but now Q' is not known.

Combining Equations 6 and 7 the following equation is obtained:

$$B = \sum_{i=1}^{N} B_i = \sum_{i=1}^{N} A\left(K \frac{\sigma_i^2 S_i^2}{Q'^2} + C\right). \qquad \text{Equation 8}$$

The following expression for Q' is obtained from Equation 8.

$$Q' = \sqrt{\frac{AK}{B - ANC} \sum_{i=1}^{N} \sigma_i^2 S_i^2} \qquad \text{Equation 9}$$

Equation 9 is the basis for the preferred rate control technique, described below.

The quantizers for encoding the N image blocks in a frame are preferably selected with the following technique.

STEP 1. Initialization. Let i=1 (first block), B,=B (available bits), $N_1$=N (number of blocks). Let $$E_1 = \sum_{k=1}^{N} \sigma_i^2 S_k^2 \qquad \text{Equation 10}$$

where $\sigma_k$ and $S_k$ are defined in equations 4 and 2, respectively. If the values of the parameters K and C in the encoder model are known or estimated in advance, e.g., using linear regression, let $K_1$=K and $C_1$=C. If the model parameters are not known, set $K_1$ and $C_1$ to some small non-negative values, such as $K_1$=0.5 and $C_1$=0 as initial estimates. In video coding, one could set $K_1$ and $C_1$ to the values $K_{N+1}$ and $C_{N+1}$, respectively, from the previous encoded frame, or any other suitable value.

STEP 2. The quantization parameter for the ith block is computed as follows:

$$Q_i = \frac{Q'}{S_i} = \frac{1}{S_i} \sqrt{\frac{AK_i}{(\tilde{B}_i - AN_iC_i)} E_i}. \qquad \text{Equation 11}$$

If the values of the Q-parameters are restricted to a fixed set (e.g., in H.263, $Q_i$=2QP and QP takes values in {1, 2, 3, . . . , 31,}, round $Q_i$ to the nearest value in the set. The square root operation can be implemented using look-up tables.

STEP 3. The ith block is encoded with a block-based coder, such as the coder of FIG. 12. Let $B_i'$ be the number of bits used to encode the ith block, compute $$\overline{B}_{i+1} = \overline{B}_i - B_i', \; E_{i+1} = E_i - \sigma_i^2 S_i^2, \; \text{and} \; N_{i+1} = N_i - 1. \qquad \text{Equation 12}$$

STEP 4. The parameters $K_{i+1}$ and $C_{i+1}$ of the coder model are updated. For the fixed mode $K_{i+1}$=K and $C_{i+1}$=C. For the adaptive mode, $K_{i+1}$ and $C_{i+1}$ are determined using any suitable technique for model fitting. For example, one could use the model fitting techniques in co-pending U.S. patent application Ser. No. 09/008,137, incorporated by reference herein.

STEP 5. If i=N, stop (all image blocks are encoded). If not, i=i+1 and go to Step 2.

Encoder System

Figure 14:
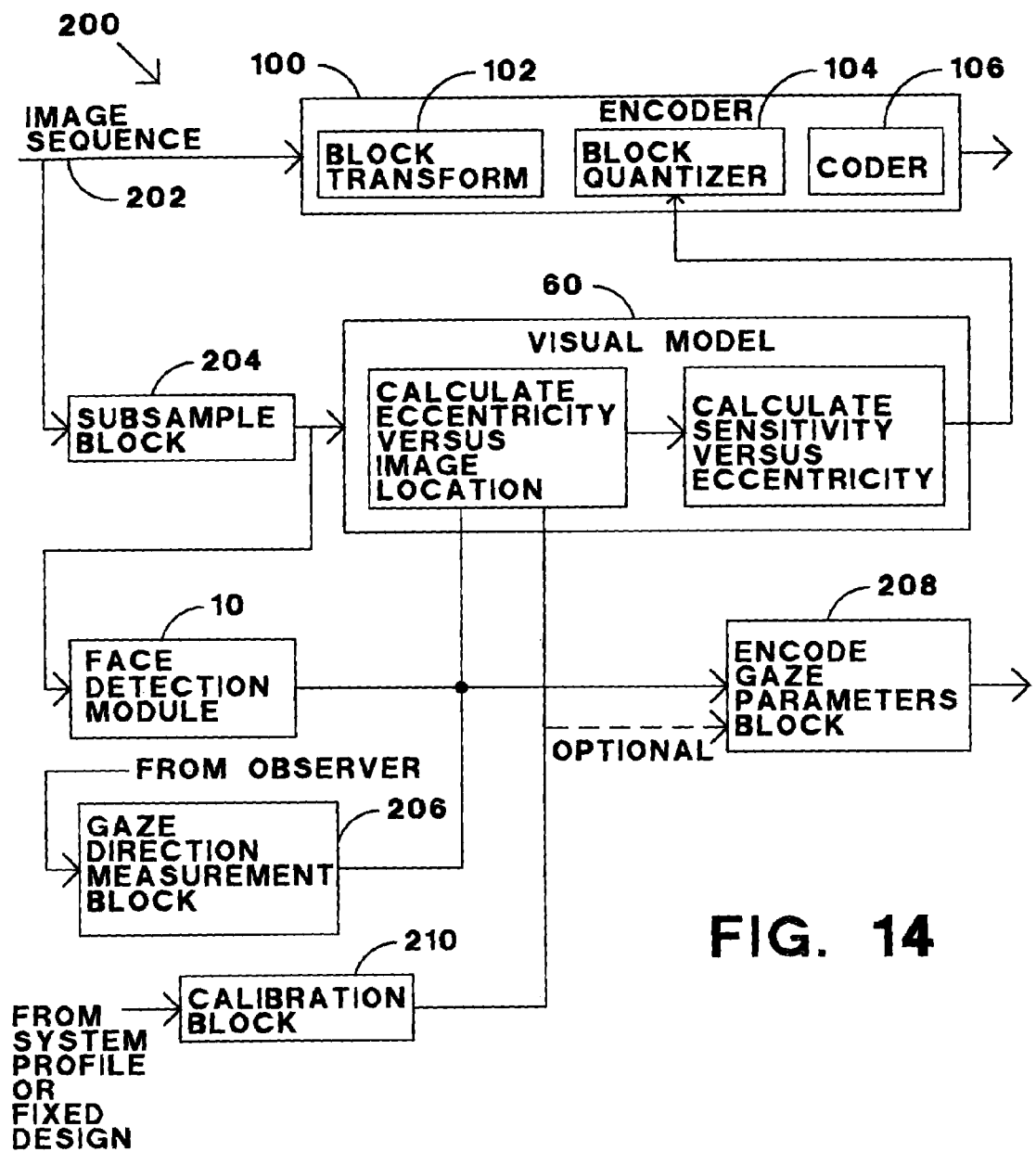
FIG. 14 is an exemplary block diagram of an encoder including the face detection module of FIG. 1, the visual model of FIG. 5, and the block-based image encoding system of FIG. 12, of the present invention.

Referring to FIG. 14, an encoder system 200 includes an input image sequence 202 which is passed to the encoder 100 and a sub-sample block 204 which decomposes the image sequence 202 into macro-blocks. The macro-blocks from the sub-sample block 204 are passed to the visual model 60 and the face detection module 10. An optional gaze direction measurement block 206 detects the location of the gaze of the viewer. The output from either the measurement block 206 or detection module 10 is passed to the visual model 60 and optionally to an encode gaze parameters block 208. Calibration parameters for the pixel size and/or viewing distance are provided to the visual model 60 and the encode gaze parameters block 208 by a calibration block 210. The visual model 60 provides its sensitivity output to the encoder 100. The encoder 100 thereafter transmits encoded data to a storage device or a decoder 300.

Figure 15:
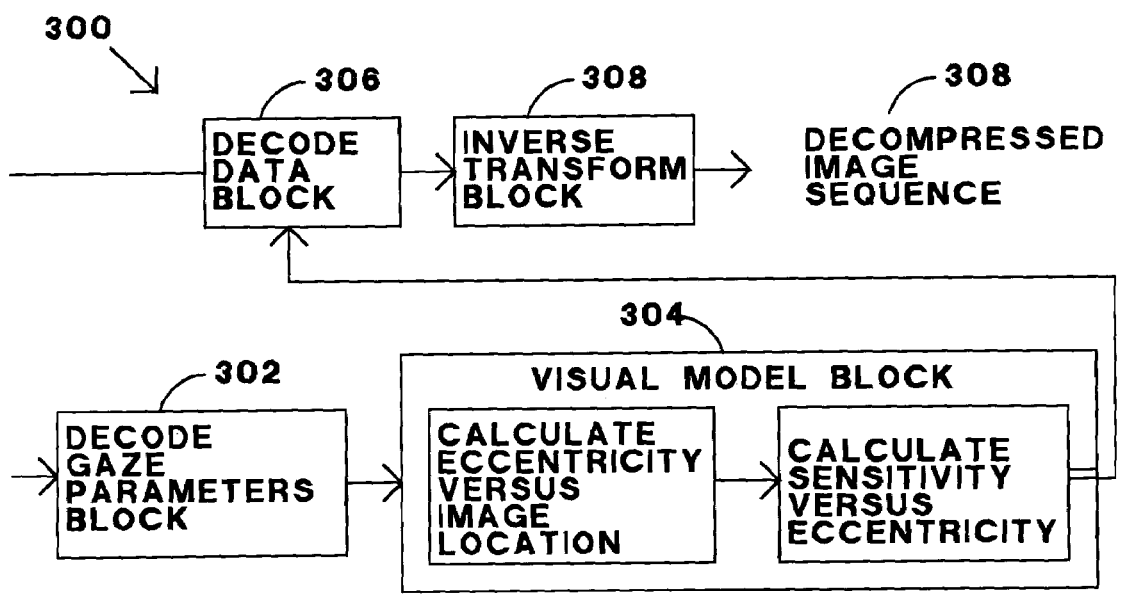
FIG. 15 is an exemplary block diagram of a decoder of the present invention.

Referring to FIG. 15, the decoder 300 decodes the gaze parameters with a decode gaze parameters block 302. A visual model block 304 calculates both eccentricity versus image location and sensitivity versus eccentricity. The visual model block 304 provides quantization parameters to the decode data block 306 which decodes the encoded data based on the quantization parameters. An inverse transform block 308 decomposes the data from the decode data block 306 to obtain a decompressed image sequence 310 for use, such as being displayed on a display.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of detecting a facial region within a video comprising the steps of:
    (a) receiving a first frame of said video comprising a plurality of pixels;
    (b) receiving a subsequent frame of said video comprising a plurality of pixels;
    (c) calculating a difference image representative of the difference between a plurality of said pixels of said first frame and a plurality of said pixels of said subsequent frame;
    (d) determining a plurality of candidate facial regions within said difference image based on a Hough transform of said difference image in a spatial domain to a parameter space of the form $A(x_c, y_c, r) = A(x_c, y_c, r) + 1 \forall x_c, y_c, r \in (x-x_c)^2 + (y-y_c)^2 = r^2$; and (e) fitting said plurality of candidate facial regions to said difference image, where said difference image used for said fitting is free from being transformed as a result of step (d), to select one of said candidate facial regions.

2. A method of detecting a facial region within a video comprising the steps of:
   (a) receiving a first frame of said video comprising a plurality of pixels;
   (b) receiving a subsequent frame of said video comprising a plurality of pixels;
   (c) calculating a difference image representative of the difference between a plurality of said pixels of said first frame and a plurality of said pixels of said subsequent frame;
   (d) determining a plurality of candidate facial regions within said difference image based on a transform of said difference image in a spatial domain to a parameter space wherein said step of determining said plurality of said candidate facial regions and fitting said plurality of said candidate facial regions further comprises the steps of:
      (i) determining a set of candidate circles based on a Hough transform of said difference image;
      (ii) scoring said set of said candidate circles based on a combination of at least three factors including, a fit factor representative of the fit of said candidate circles to said difference image, a location factor representative of the location of said candidate circles within said video, and a size factor representative of the size of said candidate circles;
      (iii) selecting at least one of said candidate circles based on said scoring;
      (iv) generating at least one candidate facial region having an elliptical shape for each of said at least one of said candidate circles; and
      (v) scoring each of said candidate facial regions based on a combination of at least three factors including, a fit factor representative of the fit of a respective said candidate facial region to said difference image, a location factor representative of the location of said respective said candidate facial region within said video, and a size factor representative of the size of said respective said candidate facial region; and
   (e) fitting said plurality of candidate facial regions to said difference image, where said difference image used for said fitting is free from being transformed as a result of step (d), to select one of said candidate facial regions.

3. The method of claim 2 wherein said generating at least one candidate facial region has a center of said elliptical shape located within a bounded region of potential locations having a greater vertical dimension than a horizontal dimension centered about the center of said respective said candidate circle.

4. A method of detecting a facial region within a video comprising the steps of:
   (a) receiving a first frame of said video comprising a plurality of pixels;
   (b) receiving a subsequent frame of said video comprising a plurality of pixels;
   (c) calculating a difference frame representative of the difference between a plurality of said pixels of said first frame and a plurality of said pixels of said subsequent frame;
   (d) determining a plurality of candidate facial regions within said difference frame based on a Hough transform of said difference image in a spatial domain to a parameter space wherein said Hough transform is $A(x_c, y_c, r) = A(x_c, y_c, r) + 1 \: \forall x_c, y_c, r \in (x-x_c)^2 + (y-y_c)^2 = r^2$; and (e) fitting said candidate facial regions to said difference image to select one of said candidate facial regions based on a combination of at least two of the following three factors including, a fit factor representative of the fit of said candidate facial regions to said difference image, a location factor representative of the location of said candidate facial regions within said difference image, and a size factor representative of the size of said candidate facial regions.

5. A method of determining sensitivity information for a video comprising the steps of:
   (a) receiving a first frame of said video;
   (b) receiving a subsequent frame of said video;
   (c) determining a spatial location of a facial region within said video based on at least said first and said subsequent frame; and
   (d) calculating a sensitivity value for each of a plurality of spatial locations within said video based upon both said spatial location of said facial region within said video in relation to said spatial plurality of locations and a non-linear model of the sensitivity of a human visual system's ability to perceive image detail at eccentric visual angles.

6. The method of claim 5 wherein the step of said calculating said sensitivity values is further based upon calculating an eccentricity versus image location in relation to a viewer of said video for said plurality of locations within said video.

7. The method of claim 6 wherein said calculating said sensitivity is further based upon a sensitivity versus eccentricity non-linear model of said human visual system.

8. The method of claim 6 wherein said eccentricity is derived according to the following:

$$\phi_E = \frac{180}{\pi} \tan^{-1}\left(\frac{\sqrt{(y-y_c)^2 + \left(\frac{x-x_c}{x_R}\right)^2 - 1}}{V}\right)$$

where $\theta_E$ is said eccentricity, y is a vertical pixel position within said video, x is a horizontal position within said video, $x_c$ represents a horizontal component of a center position of an elliptical said facial region, $y_c$ represents a vertical component of said center position of said elliptical said facial region, $x_r$ represents a first elliptical radii of said elliptical said facial feature in a horizontal direction; $y_r$ represents a second elliptical radii of said elliptical said facial feature in a vertical direction, and V represents a viewing distance.

9. The method of claim 7 wherein said sensitivity versus eccentricity non-linear model is derived according to the following, $$S = \frac{1}{1 + k_{EEC}\theta_E}$$

where S is representative of said sensitivity, $k_{ECC}$ is a constant, and $\theta_E$ is representative of a non-linear contrast sensitivity function.

10. The method of claim 5 wherein said sensitivity values are based upon the distance from the outer edge of said facial region to said plurality of locations within said video.

11. A method of encoding a video comprising the steps of:
(a) receiving a frame of said video consisting of a plurality of pixels;
(b) calculating sensitivity information for a plurality of locations within said frame of said video calculated based upon the sensitivity of a human visual system of a viewer perceiving image detail at eccentric visual angles of a particular region of said frame of said video, where said particular region of said frame is determined based upon the content of the frame itself; and
(c) encoding said frame in a manner that provides a substantially uniform apparent quality to perceiving detail at eccentric visual angles of said plurality of locations of said frame to said viewer when said viewer is observing said particular region of said frame of said video, wherein said encoding of each of said plurality of locations of said frame of said video is based on a respective quantization value representative of a base quantization factor divided by said sensitivity information for a respective one of said plurality of locations in a manner that said encoding employs at least two different quantization values, where said plurality of locations within said video are determined based upon the content of the frame itself, said encoding being derived in accordance with the following:

$$Q/S_1, Q/S_2, Q/S_3, \ldots, Q/S_N$$

where Q is representative of said base quantization factor, and $S_1$ through $S_N$ are representative of said sensitivity information for said plurality of locations, wherein one of said $S_k$, where k is a value from 1 to N, is derived based upon a statistical calculation of a plurality of said sensitivity information for one of said locations of said image.

12. The method of claim 11 wherein $S_k$ is an average of said plurality of said sensitivity information.

13. A method for encoding multiple blocks in a frame of image data, comprising:
(a) identifying a target bit value equal to a total number of bits available for encoding the frame;
(b) calculating sensitivity information for each one of the blocks based upon the sensitivity of a human visual system perceiving image detail at eccentric visual angles of a particular region of the image, where said eccentricity of said particular region of said image is determined based upon the content of the frame itself;
(c) adapting quantization values for each of the multiple blocks to provide substantially uniform apparent quality to perceiving detail at eccentric visual angles of each of the blocks in the frame subject to a constraint that the total number of bits available for encoding the frame is equal to the target bit value; and
(d) encoding the blocks with the quantization values, wherein the quantization values are derived according to the following, $$Q'\sqrt{\frac{AK}{B-ANC}\sum_{i=1}^{N}\sigma_i^2 S_i^2}$$

where, $Q_i$ is the quantization value for each block i, N is the number of blocks in the frame, B is the total number of bits available for encoding the frame, A is a number of pixels in each of the multiple blocks, K and C are constants associated with the image blocks, $\sigma_i^2$ is an empirical standard deviation of pixel values in the block, and $S_i$ is a weighting incorporating the sensitivity information for the block.

14. The method of claim 13 including using a K parameter and a C parameter on a block-by-block basis to adjust the quantization values for each of the multiple blocks, the K parameter modeling correlation statistics of the pixels in the image blocks and the C parameter modeling bits required to code overhead data.

15. The method of claim 14 including deriving the optimum quantization values in either a fixed mode where the K and C parameters are known in advance or an adaptive mode where the K and C parameters are derived according to the K and C parameters of previously encoded blocks.

16. The method of claim 15 wherein the adaptive mode includes the following steps:
(a) deriving values for the K and C parameters that exactly predict the number of bits B used for encoding previous blocks;
(b) deriving averages for the derived K and C parameters for the previously encoded video blocks; and
(c) predicting the K and C parameters for a next video block by weighting the average K and C parameters according to the initial estimates for the K and C parameters.

17. A method for encoding video comprising the steps of:
(a) detecting the location of a facial region of a frame of said video;
(b) calculating a sensitivity value for each of a plurality of locations within said frame of said video based upon said location of said facial region wherein said sensitivity values are calculated based upon a non-temporal said location of said facial region, a non-temporal size of said facial region, and a non-linear model of the human visual system's ability to perceive image detail at eccentric visual angles; and
(c) encoding said frame in manner that provides a substantially uniform apparent quality to perceiving detail at eccentric visual angles of said plurality of locations to said viewer when said viewer is observing said facial region of said video.

18. The method of claim 17 wherein said detecting said location of said facial region of said frame further comprises the steps of:
(a) receiving a first frame of said video comprising a plurality of pixels;
(b) receiving a subsequent frame of said video comprising a plurality of pixels;
(c) calculating a difference image representative of the difference between a plurality of said pixels of said first frame and a plurality of said pixels of said subsequent frame;
(d) determining a plurality of candidate regions within said difference image; and
(e) fitting said plurality of candidate regions to said difference image to select said facial region.

19. The method of claim 18 wherein said determining said plurality of candidate regions is based on a Hough transform of said difference image in a spacial domain to a parameter space.

20. The method of claim 18 further comprising the step of thresholding said difference image thereby removing values of said difference image less than a threshold value.

21. The method of claim 20 wherein said threshold value is a predetermined value and said removing values is setting said values less than said threshold value to a selected value.

22. The method of claim 18 where said fitting of each of said candidate regions is based on a combination of at least two of the following three factors including, a fit factor representative of a fit of said candidate regions to said difference image, a location factor representative of the location of said candidate regions within said video, and a size factor representative of the size of said candidate regions.

23. The method of claim 18 further comprising the step of scaling said first frame and said subsequent frame of said video to reduce the number of said pixels of said first and subsequent frame prior to said calculating said difference frame.

24. The method of claim 18 wherein said step of determining said plurality of said candidate regions and fitting said plurality of said candidate regions further comprises the steps of:
(a) determining a set of candidate circles based on a Hough transform of said difference image;
(b) scoring said set of said candidate circles based on a combination of at least three factors including, a fit factor representative of the fit of said candidate circles to said difference image, a location factor representative of the location of said candidate circles within said video, and a size factor representative of the size of said candidate circles;
(c) selecting at least one of said candidate circles based on said scoring;
(d) generating at least one candidate region having an elliptical shape for each of said at least one of said candidate circles; and
(e) scoring each of said candidate regions based on a combination of at least three factors including, a fit factor representative of the fit of a respective said candidate region to said difference image, a location factor representative of the location of said respective said candidate region within said video, and a size factor representative of the size of said respective said candidate region.

25. The method of claim 24 wherein said generating at least one candidate region has a center of said elliptical shape located within a bounded region of potential locations having a greater vertical dimension than a horizontal dimension centered about the center of said respective said candidate circle.

26. The method of claim 17 wherein said wherein the step of said calculating said sensitivity values is further based upon calculating an eccentricity versus image location in relation to a viewer of said video for said plurality of locations within said video.

27. The method of claim 26 wherein said eccentricity is derived according to the following, $$\theta_E = \frac{180}{\pi} \tan^{-1}\left(\frac{\sqrt{\frac{(y-y_c)^2}{y_R} + \left(\frac{x-x_c}{x_R}\right)^2 - 1}}{V}\right)$$

where $\theta_E$ is said eccentricity, y is a vertical pixel position within said video, x is a horizontal position within said video, $x_c$ represents a horizontal component of a center position of an elliptical said facial region, $y_c$ represents a vertical component of said center position of said elliptical said facial region, $x_r$ represents a first elliptical radii of said elliptical said facial feature in a horizontal direction; $y_r$ represents a second elliptical radii of said elliptical said facial feature in a vertical direction, and V represents a viewing distance.

28. The method of claim 17 wherein said sensitivity values are based upon the distance from the outer edge of said facial region to said plurality of locations within said video.

29. The method of claim 17 wherein said sensitivity versus eccentricity non-linear model is derived according to the following, $$S = \frac{1}{1 + k_{ECC}\theta_E}$$

where S is representative of said sensitivity, $k_{ECC}$ is a constant, and $\theta_E$ is representative of a non-linear contrast sensitivity function.

30. The method of claim 17 wherein said encoding of each of said plurality of locations is based on a respective quantization value representative of a base quantization factor divided by said sensitivity information for a respective one of said plurality of locations.

31. The method of claim 30 wherein said encoding is derived in accordance with the following:

$Q/S_1, Q/S_2, Q/S_3, \ldots, Q/S_N$ where Q is representative of said base quantization factor, and $S_1$ through $S_N$ are representative of said sensitivity information for said plurality of locations.

32. The method of claim 31 wherein one of said $S_k$, where k is a value from 1 to N, is derived based upon a statistical calculation of a plurality of said sensitivity information for one of said locations of said image.

33. The method of claim 32 wherein $S_k$ is an average of said plurality of said sensitivity information.

34. The method of claim 32 wherein $S_k$ is a maximum of said plurality of said sensitivity information.

35. The method of claim 17 wherein said encoding said frame results in the total number of bits produced for said frame being substantially equal to a preselected number.

36. The method of claim 35 wherein said frame is encoded only once.

37. The method of claim 35 wherein said encoding of each of said plurality of locations is based on a respective quantization value representative of a base quantization factor divided by said sensitivity information for a respective one of said plurality of locations.

38. The method of claim 37 wherein said base quantization factor is derived in accordance with the following:

$$Q'\sqrt{\frac{AK}{B-ANC}\sum_{i=1}^{N}\sigma_i^2 S_i^2}$$

where A is representative of the number of pixels in one of said plurality of locations, K and C are constants associated with said plurality of locations, N is representative of the number of said plurality of locations, B is representative of said total number of bits, the $\sigma_i^2$ values are a measure how much texture is associated with said plurality of locations, and the $S_i^2$ values are representative of the respective said sensitivity information squared.

39. A method for encoding video comprising the steps of:
(a) detecting the location of a facial region of a frame of said video comprising the steps of:
  (1) receiving a first frame of said video comprising a plurality of pixels;
  (2) receiving a subsequent frame of said video comprising a plurality of pixels;
  (3) calculating a difference image representative of the difference between a plurality of said pixels of said first frame and a plurality of said pixels of said subsequent frame;
  (4) determining a plurality of candidate regions within said difference image wherein said determining said plurality of candidate regions is based on a Hough transform of said difference image in a spacial domain to a parameter space wherein said Hough transform is $A(x_c, y_c, r) = A(x_c, y_c, r) + 1 \forall x_c, y_c, r \in (x-x_c)^2 + (y-y_c)^2 = r_2$; and (5) fitting said plurality of candidate regions to said difference image to select said facial region;
(b) calculating a sensitivity value for each of a plurality of locations within said frame of said video based upon said location of said facial region; and
(c) encoding said frame in manner that provides a substantially uniform apparent quality to perceiving detail at eccentric visual angles of said plurality of locations to said viewer when said viewer is observing said facial region of said video.

* * * * *